United States Patent
Tsou et al.

(10) Patent No.: US 10,858,515 B2
(45) Date of Patent: Dec. 8, 2020

(54) POLYOLEFIN-ARYLENE-ETHER NANOPLATELET COMPOSITES

(71) Applicant: ExxonMobil Chemical Patents Inc., Baytown, TX (US)

(72) Inventors: Andy H. Tsou, Houston, TX (US); Hillary L. Passino, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1 day.

(21) Appl. No.: 15/988,286

(22) Filed: May 24, 2018

(65) Prior Publication Data

US 2019/0016885 A1    Jan. 17, 2019

Related U.S. Application Data (60) Provisional application No. 62/531,156, filed on Jul. 11, 2017.

(51) Int. Cl.

| | | |
|---|---|---|
| *C08G 81/02* | (2006.01) | |
| *C08K 3/04* | (2006.01) | |
| *C08L 51/00* | (2006.01) | |
| *C08L 71/12* | (2006.01) | |
| *C08F 210/16* | (2006.01) | |
| *C08G 65/48* | (2006.01) | |
| *C08J 5/00* | (2006.01) | |
| *C08F 10/06* | (2006.01) | |
| *C08F 10/02* | (2006.01) | |
| *C08F 4/659* | (2006.01) | |

(52) U.S. Cl.
CPC .......... *C08L 71/126* (2013.01); *C08F 210/16* (2013.01); *C08G 65/485* (2013.01); *C08G 81/025* (2013.01); *C08G 81/027* (2013.01); *C08J 5/005* (2013.01); *C08K 3/04* (2013.01); *C08L 51/006* (2013.01); *C08F 4/659* (2013.01); *C08F 4/65908* (2013.01); *C08F 10/02* (2013.01); *C08F 10/06* (2013.01); *C08J 2387/00* (2013.01); *C08K 2201/005* (2013.01)

(58) Field of Classification Search
CPC ...... C08L 71/126; C08L 23/00; C08L 51/006; C08F 210/16; C08F 4/659; C08F 4/65908; C08F 10/02; C08F 10/06; C08J 5/005; C08J 2387/00; C08K 3/04; C08K 2201/005; C08G 65/485; C08G 81/025

See application file for complete search history.

(56) References Cited

U.S. PATENT DOCUMENTS

| | | | | |
|---|---|---|---|---|
| 3,522,326 A | * | 7/1970 | Hay | ...................... C08F 283/06 525/391 |
| 4,994,531 A | * | 2/1991 | Brown | .................. C08F 283/08 525/391 |
| 9,695,288 B2 | | 7/2017 | Yang et al. | |
| 9,708,435 B2 | | 7/2017 | Blok et al. | |
| 9,815,946 B2 | | 11/2017 | Yang et al. | |
| 9,840,597 B2 | | 12/2017 | Tsou et al. | |
| 2009/0105374 A1 | * | 4/2009 | Wu | .......................... C08L 23/06 524/8 |
| 2010/0147188 A1 | * | 6/2010 | Mamak | .................. B82Y 30/00 106/31.13 |
| 2016/0130395 A1 | | 5/2016 | Yang et al. | |
| 2019/0047325 A1 | * | 2/2019 | Tsou | ........................ C08L 51/08 |

FOREIGN PATENT DOCUMENTS

WO    WO-2015076878 A1 *   5/2015

OTHER PUBLICATIONS

Lu, T. et al. Wear vol. 309 pp. 43-51 published online Nov. 2013.*
U.S. Appl. No. 15/485,389, Yang, "Polycarbonate-polyolefin Block Copolymers and Methods of Making Them", filed Apr. 12, 2017.

* cited by examiner

Primary Examiner — Irina S Zemel
Assistant Examiner — Jeffrey S Lenihan
(74) Attorney, Agent, or Firm — Catherine L. Bell (57) ABSTRACT

Disclosed is a graft copolymer comprising an arylene-ether oligomer group having at least one polyolefin moiety bound thereto, wherein the arylene-ether oligomer has a number average molecular weight of less than 5,000 g/mole and the polyolefin has Mw of less than 10,000 g/mole. Also disclosed is a method to prepare a graft copolymer comprising reacting a neat or diluted arylene-ether oligomer with a vinyl or vinylidene-terminated polyolefin at a temperature of at least 80 or 100 or 120° C. to form heated reaction components; further reacting a Brønsted acid or Lewis acid with the heated reaction components to form a polyolefin-arylene-ether oligomer.

17 Claims, 2 Drawing Sheets

POLYOLEFIN-ARYLENE-ETHER NANOPLATELET COMPOSITES

CROSS REFERENCE TO RELATED APPLICATIONS

This application claims the benefit of priority from U.S. Provisional Application No. 62/531,156, filed Jul. 11, 2017, which is incorporated herein by reference.

FIELD OF THE INVENTION

The present invention relates to graft copolymers comprising arylene-ethers such as phenyl-ether oligomers and polyolefins, especially low molecular weight polyethylene, and use of such graft copolymers in polyolefin composite blends with graphite platelets.

BACKGROUND

Semi-crystalline polyolefins, such as polyethylene and polypropylene, are exceptional plastics for their excellent processability, ductility, toughness, temperature properties, and thermal and oxidative resistances. However, due to their relative low crystalline cohesive energies (based on only van der Waal interactions), their crystals are not stiff and have relatively low melting temperatures as compared to engineering thermoplastics (ETPs). Thus, polyolefin plastics are typically softer and have low heat distortion temperatures than those of ETPs and have limited usages in application areas that demand high temperature resistance, such as under the hood, and require high stiffness, such as the automobile structural materials. One can raise the stiffness and heat distortion temperature (HDT) of a polyolefin by adding inorganic fillers, such as calcium carbonates and talc, which is a common practice in preparing thermoplastic olefins compounds (TPO), at loadings of 20 wt % or higher. However, it is proposed that the use of nano-fillers, where one of the filler dimension is less than 100 nm, with adequate dispersion, one can raise the stiffness and HDT of a polyolefin using less nano-fillers relative to other inorganic due to their high surface areas.

Inorganic polar nano-fillers, such as the cationic nano-clays and anionic nano-talc, have been utilized in polar polymers of epoxy, nylon, and epoxidized natural rubber, but are difficult to incorporate into non-polar polyolefins. Carbon based nano-fillers, such as carbon nano-fibers, multi-walled carbon nanotubes (MWNT's), and graphite nano-platelets, have better compatibility with polyolefin and can be dispersed in polyolefin, but they still require dispersants to prevent these nano-fillers from coalescing. Carbon nano-fibers and MWNTs are one-dimensional fillers and have fiber and tube diameters less than 100 and 50 nm, respectively, but with fiber and tube lengths greater than microns. They are easily chopped up during extrusion mixing and can lose their reinforcement effectiveness. Also, they cannot be easily fed into the extruder and require carriers due to their extremely low bulk density.

Graphene nanoplatelets (GNP's), two-dimensional fillers obtained by expanding graphite, having an average thickness of 10 to 20 nm (containing many graphene layers where each one is less than 0.5 nm thick) and diameters of at least 5 microns and above can survive the melt extrusion process without damage and can be fed directly into the extruder. They are preferred carbon based nano-fillers for their cost and ease of processing in polyolefin materials that need stiffness and HDT reinforcements in applications that can use black and dark polyolefin composites, such as pipes and car door inside structures. However, GNP's require dispersants to keep them dispersed in polyolefins, especially in high density polyethylene (pipe materials) and isotactic polypropylene (door inside structure), where they could find widespread use. An improved method of using GNP's in polyolefins is needed.

Related publications include US 2016/0130395, and U.S. Ser. No. 15/485,389 filed Apr. 12, 2017.

SUMMARY

Disclosed is a graft copolymer (PPE-g-PO) comprising (or consisting of, or consisting essentially of) an arylene-ether oligomer group having at least one polyolefin moiety bound thereto, wherein the arylene-ether oligomer has a number average molecular weight (Mn) of less than 5,000 g/mole and the polyolefin has Mw of less than 10,000 g/mole.

Also disclosed is a method to prepare a PPE-g-PO comprising (or consisting of, or consisting essentially of) reacting a neat or diluted arylene-ether oligomer with a vinyl or vinylidene-terminated polyolefin at a temperature of at least 80 or 100 or 120° C. to form heated reaction components; and further reacting a Brønsted acid or Lewis acid with the heated reaction components, separated or not, to form a polyolefin-arylene-ether oligomer (PPE-g-PO).

In any embodiment, the process also comprises solution blending a graphite with the PPE-g-PO to form a masterbatch, followed by melt blending the masterbatch with a polyolefin.

DETAILED DESCRIPTION

The present invention(s) are directed to the synthesis of low molecular weight dispersants with an arylene-ether oligomer (PPE) backbone with grafted side arms of low molecular weight polyolefin (PO), and composites including the graft copolymers. This is achieved by grafting vinyl terminated semi-crystalline polyolefin (VTPO) onto the desired arylene-ether oligomer via Friedel Crafts alkylation. The PPE-g-PO product, a polyolefin-arylene-ether (PPE-g-PO), would cover the surface of a desirable graphite material with a PPE backbone through $\pi$ and $\pi^*$ interactions, while its attached PO arms extend away as brushes to effect dispersion in a polyolefin matrix. In other words, the PPE-g-PO would act as a dispersant to disperse the relatively polar graphite (with solubility parameter of 23 $MPa^{1/2}$) in non-polar polyolefin (polyethylene and propylene with solubility parameter of 16 $MPa^{1/2}$). Utilization of PPE oligomers with a number average molecular weight of PPE less than 5,000 g/mole, and low molecular weight polyolefin with number average molecular weight of less than 10,000 g/mole allows the resulting low molecular weight PPE-g-PO sufficient mobility to migrate to the GNP surfaces and prevents the self-association, or micellization, of PPE-g-PO in polyolefin. Also disclosed is a method of solution blending of the PPE-g-PO dispersant and GNP's to prepare a dispersant/GNP master batch. Solution blending using aromatic solvents could break up the GNP agglomerates enabling surface coverage of GNP by PPE-g-PO dispersants. This master batch is then blended in a solid-state mixer with polyolefin and let down for a final polyolefin GNP composite with a given GNP content.

Thus, in any embodiment is a PPE-g-PO comprising (or consisting of, or consisting essentially of) an arylene-ether oligomer group having at least one polyolefin moiety bound thereto, wherein the arylene-ether oligomer has a number average molecular weight (Mn) of less than 5,000 g/mole and the polyolefin has Mn of less than 10,000 g/mole.

Also, in any embodiment is a method to prepare a PPE-g-PO comprising (or consisting of, or consisting essentially of) reacting a neat or diluted arylene-ether oligomer with a vinyl or vinylidene-terminated polyolefin at a temperature of at least 80 or 100 or 120° C. to form heated reaction components; further reacting a Brønsted acid or Lewis acid with the heated reaction components to form a polyolefin-arylene-ether oligomer (PPE-g-PO).

The PPE-g-PO can be combined with graphite nanoparticles to form a composite suitable for blending with polyolefins such as high density polyethylene in amounts of up to 15 wt % of the graphite nanoparticles, and up to 40 wt % of the PPE-g-PO by weight of the components. The components of the inventive composites are described in more detail below.

Vinyl-Terminated Polyolefin

In any embodiment, the "vinyl terminated polyolefin" (VTPO) suitable for use herein include polyolefins that may include vinyl-terminated polyolefins, vinylidene-terminated polyolefins, or a mixture of both vinyl- and vinylidene-terminated polyolefins, more generally referred to as polyolefins having "allylic" chain ends. In any embodiment, the VTPO's useful herein are polymers as first described in U.S. Pat. No. 8,372,930 having at least one allylic-terminus ($CH_2=CHCH_2$-oligomer or polymer) represented by formula (I):

where "PO" represents the polyolefin portion of the inventive graft copolymer. In any embodiment, the allyl chain ends are represented by the formula (II):

The amount of allyl chain ends is determined using $^1H$ NMR at 120° C. using deuterated tetrachloroethane as the solvent on a 500 MHz machine, and in selected cases confirmed by $^{13}C$ NMR, according to reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated polyolefins in Resconi et. al, 114 J. AM. CHEM. SOC., 1025-1032 (1992).

In any embodiment, the isobutyl chain end is represented by one of the following formulae (III):

The vinyl/vinylidene-terminated propylene-based polymers may also contain an isobutyl chain end at the end opposite the allyl group. "Isobutyl chain end" is defined to be an oligomer having at least one terminus represented by the formula (IV):

The percentage of isobutyl end groups can be determined using 13C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPO's can be made by any suitable means, but most preferably the VTPO's are made in a conventional slurry or solution polymerization process using a combination of bridged metallocene catalyst compounds (especially bridged bis-indenyl or bridged 4-substituted bis-indenyl metallocenes) with a perfluorinated borate anionic activator with a bulky organic cation, such as dimethylaniliniumtetrakis-(perfluoronaphthyl) borate, or trityl-(perfluoronaphthyl) borate for example, as described in WO 2015/009474, U.S. Pat. Nos. 8,841,397 and 8,623,974. The most preferable low molecular weight vinyl terminated polyethylenes are made in a conventional slurry or solution polymerization process using a combination of group IV organometallic catalysts comprising salan ligands comprising a carbazole moiety activated by a perfluorinated borate anionic activator, as described in U.S. Pat. Nos. 8,957,171 and 9,045,568.

The vinyl/vinylidene-terminated polyolefin (and the corresponding "PO" group) can be any polyolefin having a vinyl/vinylidene-terminal group. In any embodiment, each vinyl/vinylidene-terminal polyolefin substituent independently comprises a C2 to C14 homopolymer, a C2 to C14 random polyolefin, an elastomeric C2 to C14 polyolefin, a C2 to C14 impact copolymer, or a C2 to C14 block copolymer (comprising distinct chain runs of one type of α-olefin "A" linked to other runs of another type of α-olefin "B" to form an AB, ABA, ABAB, etc. structure). In any embodiment, each of the vinyl/vinylidene-terminal polyolefin substituents independently comprises polyethylene, atactic polypropylene, syndiotactic polypropylene, isotactic polypropylene, ethylene-propylene copolymer, ethylene-butene copolymer, ethylene-hexene copolymer, ethylene-octene copolymer, propylene-butene copolymer, propylene-hexene copolymer, or propylene-octene copolymer. Most preferably, the polyolefin group is a polyolefin selected from the group consisting of polyethylene, polypropylene, ethylene-propylene copolymer, hexene-ethylene copolymer, octene-ethylene copolymer, and combinations thereof.

In any embodiment, the VTPO comprises a third comonomer selected from the group consisting of C4 through C14 units derived from C4 to C14 olefins, or α-olefins, or dienes. In any embodiment, the VTPO comprises from 5 to 30 wt % of this third comonomer, which in any embodiment may comprise an ethylene —$C_2$— content from 5 to 50 wt % and a propylene —$C_3$— content from 20 to 90 wt %.

In any embodiment greater than 70, or 80, or 90, or 94, or 96% of the individual VTPO molecules comprises terminal vinyl and/or vinylidene groups; or within the range of from 50, or 60 wt % to 70, or 80, or 90, or 95, or 98 or 99 wt %.

In any embodiment, the vinyl/vinylidene-terminated polyolefin has a number average molecular weight (Mn) value of less than 10,000, or 8,000, or 6,000, or 4,000 g/mole, or within a range from 200, or 300, or 400, or 500, or 600 g/mole to 2,000, or 4,000, or 6,000, or 8,000, or 10,000 g/mole. In any embodiment, the vinyl/vinylidene-terminated polyolefin has a weight average molecular weight (Mw) value of less than 50,000, or 40,000, or 30,000, or 20,000, or 15,000 g/mole, or within a range from 5,000, or 6,000, or 7,000 g/mole to 15,000, or 20,000, or 30,000, or 40,000, or 50,000 g/mole. The VTPO's most useful herein have a molecular weight distribution (Mw/Mn) of less than 3.0 or 4.0 or 5.0, or within a range from 1.8, or 2.0 to 3.0, or 4.0, or 5.0.

In any embodiment, the VTPOs are linear or branched polymers described quantitatively as having a branching index, g', of at least 0.60 or 0.70 or 0.75 or 0.80, determined as described herein.

In any embodiment, the VTPO is a mixture comprising vinyl or vinylidene terminated polyolefins represented by the formula (V):

(V)

wherein each "R" is selected from hydrogen and $C_1$ to $C_{10}$ alkyls, or $C_1$ to $C_4$ alkyls, or methyl, or mixtures thereof; and n is an integer from 20, or 40 to 100, or 200, or 500, or 800, or 1000, or 1500, or 2000. Suitable VTPO's are then reacted under suitable conditions, e.g., under suitable alkylation conditions, with a substituted or unsubstituted arylene-ether oligomer to effect grafting to form the PPE-g-PO.

Arylene-Ether Oligomer and Alkylation

As used herein, "arylene-ether oligomer" (PPE) refers to compounds having from 3, or 4 to 5, or 8, or 10 repeating units comprising an arylether group. Such compounds can be represented by the following formula (VI):

(VI)

wherein "n" can be an integer from 4 to 10, preferably from 4 to 6; and any one or more hydrogen position can be replaced with a C1 to C10 alkyl, a C6 to C20 arylene, a C7 to C22 alkylarylene, C1 to C10 alkoxy, a C6 to C20 aryloxy, a C7 to C22 alkylaryloxy halogens, hydroxyl groups, and combinations thereof. In any embodiment, adjacent hydrogen positions can be replaced with hydrocarbyl groups forming a ring, preferably an aromatic ring such that the whole forms, for example, a naphthyl group.

In any embodiment, the arylene-ether oligomer group has a number average molecular weight (Mn) of less than 5,000, or 4,000, or 3,000, or 2,000, or 1,000 g/mole, or within a range of from 100, or 400 g/mole to 1,000, or 2,000, or 3,000, or 4,000, or 5,000 g/mole. Preferably, the arylene monomer units are linked to one another in the meta position through an oxygen atom, but can be linked in the para position as well, or a combination of meta/para linkages.

In any embodiment, the PPE-g-PO is produced via alkylation of the arylene-ether oligomer with the VTPO, or more specifically, the VTPE. In any embodiment, the alkylation reaction is catalyzed by a Lewis acid (e.g. $BF_3$) or Brønsted acid (e.g. sulfuric acid). The acid catalyst activates the alkene to form a carbocation species, which then reacts with aromatics. In particular, the alkylation reaction comprises combining a neat or diluted VTPO with the aromatics at a temperature of at least 80 or 100 or 120° C., or within a range from 80 or 100° C. to 120 or 130 or 140° C., to form heated reaction components, then combining a Brønsted acid or Lewis acid with the heated reaction components to obtain the polyolefin grafted arylene ether (PPE-g-PO). Desirable acids include such acids as methanesulfonic acid (MSA). Other Brønsted acids that are useful include $H_2SO_4$, HCl, HBr, HI, $HNO_3$, $CH_3COOH$, $CF_3COOH$, $H_3PO_4$, $H_2S$, organic ($C_1$ to $C_{20}$) carboxylic or sulfonic acids.

Lewis acids are also useful. Categories of useful Lewis acids include those comprising $Al^{3+}$, $Cu^{2+}$, $Fe^{2+}$, $Fe^{3+}$, $Ti^{2+}$, $Sn^{2+}$, and the like, electron deficient compounds including $BF_3$, $AlF_3$, $AlCl_3$, and the like, acids having a central atom having more than 8 valence shell electrons, such as $SiBr_4$, $SiF_4$, and the like, and/or compounds having multiple bonds between two atoms of different electronegativities, such as $CO_2$, $SO_2$, and the like. In any embodiment, the alkylation reaction components are dissolved in an organic solvent, such as, for example, dichlorobenzene, where they are contacted with one another and heated to effect the reaction between them.

The resulting PPE-g-PO is useful in blends with graphite nanoparticles and polyolefins, preferably a polyolefin that matches the "PO" group of the PPE-g-PO, to form a composite useful in high temperature and/or structural applications.

Nanoparticles

The composites described herein typically include nanoparticles of graphite (preferably graphene). The nanoparticles have at least one dimension (length, width or thickness) of less than 100 nanometers. Alternately two dimensions (length, width or thickness) are less than 100 nanometers, alternately all three dimensions (length, width and thickness) are less than 100 nanometers. Preferably, the nanoparticle is a sheet having a thickness of less than 100 nanometers and a length and or width that is at least 10 times greater than the thickness (preferably 20 to 500 times, preferably 30 to 500 times the thickness). Alternatively, the graphite has a shape that is needle-like or plate-like, with an aspect ratio greater than 1.2 (preferably greater than 2, preferably greater than 3, preferably greater than 5, preferably greater than 10, preferably greater than 20), where the aspect ratio is the ratio of the longest dimension to the shortest dimension (length, width, and thickness) of the particles, on average. Alternatively, the graphite is pulverized. Useful graphites may have a specific surface area of 10 to 2000 $m^2/g$, preferably from 50 to 1000 $m^2/g$, preferably from 100 to 900 $m^2/g$.

Preferably, the graphite (preferably graphene) has up to 50 wt % present in the beta form, typically form 5 to 30 wt %. Alternatively, the graphite (preferably graphene) is present in the alpha form, having typically less than 1 wt % beta form, preferably 0 wt % beta form.

In any embodiment the expandable graphite useful for graphite nanoplatelets has a median particle diameter within a range from of 0.1, or 1, or 5, or 10 to 100, or 200, or 300, or 400, or 500 microns. In any embodiment the expandable graphite has an expansion ratio of up to 350 $cm^3/g$, and/or c) a pH of 2 to 11, (preferably 4 to 7.5, preferably 6 to 7.5). Expandable graphite can be purchased from GRAFTech International or Asbury Carbons, Anthracite Industries, among others. Particularly useful expandable graphite includes GRAFGUARD™ Expandable Graphite Flakes.

Preferably, the expandable graphite has an onset temperature (temperature at which it begins to expand) of at least 160° C. or more, alternately 200° C. or more, alternately 400° C. or more, alternately 600° C. or more, alternately 750° C. or more, alternately 1000° C. or more. Preferably, the expandable graphite has an expansion ratio of at least 50:1 $cm^3/g$, preferably at least 100:1 $cm^3/g$, preferably at least 200:1 $cm^3/g$, preferably at least 250:1 $cm^3/g$ at 600° C. Alternatively, the expandable graphite has an expansion ratio of at least 50:1 $cm^3/g$, preferably at least 100:1 cc/g, preferably at least 200:1 $cm^3/g$, preferably at least 250:1 $cm^3/g$ at 150° C. The graphite may be expanded before it is combined with the other blend components or it may be expanded while blending with other blend components.

Preferably, the graphite is or comprises graphene nanoplatelets (GNP's). "Graphene nanoplatelets" are a one-atom-thick planar sheet of sp2-bonded carbon atoms that are densely packed in a honeycomb crystal lattice. Graphene is the basic structural element of graphitic materials including graphite, as graphite can be considered to be many layers of graphene. Graphene can be prepared by micromechanical cleavage of graphite (e.g., removing flakes of graphene from graphite) or by exfoliation of intercalated graphitic compounds. Likewise, graphene fragments can be prepared through chemical modification of graphite. First, microcrystalline graphite is treated with a strongly acidic mixture of sulfuric acid and nitric acid. Then the material is oxidized and exfoliated resulting in small graphene plates with carboxyl groups at their edges. These are converted to acid chloride groups by treatment with thionyl chloride; next, they are converted to the corresponding graphene amide via treatment with octadecylamine. The resulting material is soluble in tetrahydrofuran, tetrachloromethane, and dichloroethane (see, e.g., Niyogi, et al. "Solution Properties of Graphite and Graphene," 128(24) J. AM. CHEM. SOC. 7720-7721 (2006)).

In any embodiment, the graphite nanoplatelets useful herein, most preferably GNP, have an average thickness within a range from 2, or 5, to 10, or 15, or 20, or 40, or 60, or 80, or 100 nanometers and an average planar width within a range from 1 to 20, or 30, or 40, or 50 μm. In any embodiment, the graphite nanoplatelets have an average surface area within a range from 100, or 200, or 300 $m^2/g$ to 600, or 800, or 1000 $m^2/g$. In any embodiment, the graphite nanoplatelets have a density within a range from 1, or 1.5, or 2 $g/cm^3$ to 3, or 3.5, or 4 $g/cm^3$ density. Particularly useful GNP's, or short stacks of graphene sheets, include grades H, M, and C of xGnP™ GNP's, commercially available from XG Sciences, Inc., and N008-N, N008-P, and N006-P GNP materials, commercially available from Angstron Materials, Inc.

Alternatively, the graphite is present in the elastomer composite as dispersed nanosheets having a thickness of less than 100 nanometers, preferably less than 50 nanometers, preferably less than 30 nanometers.

Polyolefin Composites

As stated above, disclosed is a PPE-g-PO comprising (or consisting of, or consisting essentially of) an arylene-ether oligomer group such as a 4 to 5 member phenyl-ether oligomer group having at least one polyolefin moiety bound thereto, especially a moiety matching the polyolefin in which the PPE-g-PO will be blended, wherein the arylene-ether oligomer preferably has a number average molecular weight (Mn) of less than 5,000 g/mole and the polyolefin preferably has Mn of less than 10,000 g/mole. The polyolefin group can be any homo- or co-polyolefin, but is preferably selected from the group consisting of polyethylene, polypropylene, ethylene-propylene copolymer, hexene-ethylene copolymer, octene-ethylene copolymer, and combinations thereof.

The PPE-g-PO is made by an alkylation process. In any embodiment, the method to prepare a PPE-g-PO comprising (or consisting of, or consisting essentially of) reacting a neat or diluted arylene-ether oligomer with a VTPO at a temperature of at least 80 or 100 or 120° C. to form heated reaction components. Next Brønsted acid or Lewis acid catalyst is further reacted with the heated reaction components to form a polyolefin-arylene-ether graft copolymer. The acid catalyst may be added after heating, before heating, or at the same time. The VTPO should of course correspond to the desired polyolefin co-unit of the PPE-g-PO. Preferably, the VTPO is a polyolefin selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

Blends of the PPE-g-PO with graphite nanoplatelets and a polyolefin form inventive composites. In any embodiment, the graphite nanoplatelets have an average surface area within a range from 100, or 200, or 300 $m^2/g$ to 600, or 800, or 1000 $m^2/g$. Also, in any embodiment, the graphite nanoplatelets have a density within a range from 1, or 1.5, or 2 $g/cm^3$ to 2.5, or 3, or 3.5, or 4 $g/cm^3$ density. The polyolefin can be any polyolefin, preferably matching the "PO" group. In any embodiment the polyolefin is selected from the group consisting of polyethylene (e.g., LDPE, LLDPE, HDPE), polypropylene (e.g., syndiotactic PP, isotactic PP, atactic PP, copolymers), ethylene-propylene copolymer and ethylene-propylene rubber, hexene-ethylene copolymer, octene-ethylene copolymer, and combinations thereof.

Most preferably the polyolefin is HDPE, most preferably a bimodal HDPE having two distinct components as elucidated in a GPC chromatogram. In any embodiment the HDPE has a density of at least 0.935, or 0.94 g/cm$^3$. In any embodiment, the HDPE has an Mw/Mn of at least 3, or 5, or 10, or 15, or 20.

Density can be determined according to ASTM D1505-10. Compression molded samples for density measurements are made according to ASTM D4703-10a. Samples are conditioned by 40 hours conditioning of the density molded specimens (typically made from pellet samples) at 23° C. before density measurement.

The inventive composites comprise within a range from 1, or 3, or 5 wt % to 20, or 30, or 40 wt % of the PPE-g-PO by weight of the polyolefin, preferably HDPE, PPE-g-PO, and graphite nanoplatelets. The inventive composites also comprise within a range from 1, or 2, or 3 wt % to 8, or 10, or 15 wt % graphite nanoplatelets by weight of the polyolefin, preferably HDPE, PPE-g-PO, and graphite nanoplatelets.

The graphite can blended with the PPE-g-PO separately from blending with the polyolefin, or the three components can be blended simultaneously. Preferably, the graphite is dry and solution/slurry blended with the graft copolymer, isolated as a masterbatch, then blended or melt blended with the polyolefin. Any desirable solvent, especially an aromatic solvent, can be used to suspend the graphite, preferably one that will dissolve or mostly dissolve the graft copolymer and allow the two to be well blended, then dried. The dissolution/suspension can take place at any temperature up to the reflux temperature of the solvent at the desired pressure. In any embodiment, prior to removing the solvent, some or all of the polyolefin can also be solution blended.

The blended components, having had the solvent removed, can then be formed into useful articles through thermoforming, melt extrusion, blow molding, or any other suitable means. Specific uses of the inventive composite of the polyolefin blended with the graphite and PPE-g-PO includes automotive components and pipes, especially internal automotive door frames where the color of the product will not be an issue. Since the inventive composites will have an elevated temperature usage, applications under the hood are desired, mainly the automotive structural materials to support many components such as the engine mount frame and other supported structures for battery, for brake fluid, for compressor, where in some cases the presence of the black-colored graphite is an advantage.

One useful form for the inventive composites is that of a film or sheet, which can then be formed through various means into desirable articles. The films or sheets can be flat or form a cylinder. Flexible films are typically less than 250 µm in average thickness, whereas sheets are at least 250, or 500 µm to 2, or 4, or 6, or 10 mm in average thickness. Sheet/film extrusion is used to extrude plastic sheets or films that are too thick to be blown and is a useful process for the composites described herein. There are two types of dies preferably used: T-shaped and coat hanger. The purpose of these dies is to reorient and guide the flow of polymer melt from a single round output from the extruder to a thin, flat planar flow. Both die types ensure constant, uniform flow across the entire cross-sectional area of the die. Cooling is typically accomplished by pulling or otherwise guiding the warm material through a set of cooling rolls (calender or "chill" rolls). In sheet extrusion, these rolls not only deliver the necessary cooling but also determine sheet thickness and surface texture. Often co-extrusion is used to apply one or more layers on top of a base material to obtain specific properties such as UV-absorption, texture, oxygen permeation resistance, or energy reflection.

A useful article-forming process for the composite sheets is thermoforming, where the sheet is heated until soft (plastic), and formed via a mold into a new shape. When vacuum is used, this is often described as vacuum forming. Orientation of the composite material (i.e., available density of the sheet to be drawn to the mold which can typically vary in depths from 1 to 30, or 40 centimeters) often occurs in certain materials and can occur with the inventive composites and can affect forming cycle times, and the properties of the final article formed from the composites.

Extruded tubing and pipes can be manufactured using very a number of die designs. There are general types of dies that are useful: annular (or crosshead), spider, and spiral dies. Annular dies are the simplest, and rely on the polymer melt channeling around the entire cross section of the die before exiting the die; this can result in uneven flow. Spider dies consist of a central mandrel attached to the outer die ring via a number of "legs". While flow is more symmetrical in spider dies than in annular dies, a number of weld lines are produced which can weaken the extruded shape. Spiral dies remove the issue of weld lines and asymmetrical flow, but are the most complex of die designs. In any case, positive pressure can be applied to the internal cavities of the dies through a pin, or negative pressure can be applied to the outside diameter using a vacuum sizer to ensure correct final dimensions. Additional lumens or holes may be introduced by adding the appropriate inner mandrels to the die.

The inventive composites can also be co-extruded with other materials. "Co-extrusion" is the extrusion of multiple layers of material simultaneously, or in sequence. This type of extrusion utilizes two or more extruders to melt and deliver a steady volumetric throughput of different viscous polymers to a single extrusion head (die) which will extrude the materials in the desired form. This technology is used on any of the processes described herein. The layer thicknesses are controlled by the relative speeds and sizes of the individual extruders delivering the materials. Multi-layer tubing applications are useful within the automotive industry, plumbing and heating industry, and the packaging industry.

The various descriptive elements and numerical ranges disclosed herein for the graft copolymers and methods of forming such, and their use with graphene and in blends with polyethylenes can be combined with other descriptive elements and numerical ranges to describe the graft copolymers and composites thereof; further, for a given element, any upper numerical limit can be combined with any lower numerical limit described herein, including the examples in jurisdictions that allow such combinations.

EXAMPLES

Proton Nuclear Magnetic Resonance (NMR).

A polymer sample is appropriately prepared by dilution in a deuterated solvent and placed in a NMR spectrometer for acquiring a NMR spectrum. Thus resulting NMR spectral positions, coupling patterns, and integrations are then used to identify and quantify species in the polymer sample. The proton NMR spectra were collected on a 500 Agilent DD2 NMR spectrometer at 120° C. from polymer samples dissolved in a tetrachloroethane-d$_2$ solvent.

Modulus and Break Strain.

Mechanical tensile properties, including modulus and break strain, were determined in accordance to ASTM D638. All polyethylene samples were first compression molded at 200° C. into ASTM test specimens followed by tensile testing using an Intron machine.

Thermal Stability.

Thermal stability measure the degradation onset temperature with units of degrees. Compression molded polyethylene specimens were loaded inside a TGA (thermal gravimetric analyzer) pan on a balance. Their weight loss as a function a temperature in the presence of a selected gas was measured to determine the onset of thermal degradation. All polyethylene samples were evaluated for their onset temperatures on weight loss, or their degradation onset temperatures, in nitrogen at a heat up rate of 10° C./min.

Gel Permeation Chromatograph.

The distribution and the moments of molecular weight (Mw, Mn, Mw/Mn) were determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns were used to provide polymer separation. Aldrich reagent grade 1,2,4-trichlorobenzene (TCB) with 300 ppm of the antioxidant butylated hydroxytoluene was used as the mobile phase. The TCB mixture was filtered through a 0.1 µm Teflon filter and degassed with an online degasser before entering the GPC instrument. The nominal flow rate was 1.0 ml/min and the nominal injection volume is 200 The whole system including transfer lines, columns, detectors were contained in an oven maintained at 145° C. A given amount of polymer sample was weighed and sealed in a standard vial with 80 µL flow marker (heptane) added to it. After loading the vial in the autosampler, polymer was automatically dissolved in the instrument with 8 ml added TCB solvent. The polymer was dissolved at 160° C. with continuous shaking for about 1 hour for most polyethylene samples or 2 hour for polypropylene samples. The TCB densities used in concentration calculation were 1.463 g/ml at room temperature and 1.284 g/ml at 145° C. The sample solution concentration was from 0.2 to 2.0 mg/ml, with lower concentrations being used for higher molecular weight samples.

The concentration "c" at each point in the chromatogram was calculated from the baseline-subtracted IR5 broadband signal intensity "I" using the following equation:

$$c = \beta I,$$

where β is the mass constant determined with polyethylene or polypropylene standards. The mass recovery was calculated from the ratio of the integrated area of the concentration chromatography over elution volume and the injection mass which is equal to the pre-determined concentration multiplied by injection loop volume.

The conventional molecular weight was determined by combining universal calibration relationship with the column calibration which was performed with a series of monodispersed polystyrene (PS) standards ranging from 700 g/mole to 10,000,000 g/mole. The molecular weight "M" at each elution volume was calculated with following equation:

$$\log M = \frac{\log(K_{PS}/K)}{a+1} + \frac{a_{PS}+1}{a+1}\log M_{PS},$$

where the variables with subscript "PS" stands for polystyrene while those without a subscript are for the test samples. In this method, $a_{PS}=0.67$ and $K_{PS}=0.000175$ while "a" and "K" are calculated from a series of empirical formula established in the literature (T. Sun, P. Brant, R. R. Chance, and W. W. Graessley, 34(19) MACROMOLECULES 6812-6820 (2001)). Specifically, the value of a/K is 0.695/0.000579 for polyethylene and 0.705/0.0002288 for polypropylene. Values for Mn and Mw are ±5%.

Vinyl Terminated Polyethylene Synthesis.

Polymerization reactions were carried out in a well-stirred 2-liter batch reactor equipped to perform coordinative insertion polymerization in the presence of an inert hydrocarbon (isohexane) solvent at temperatures up to 150° C. In the vapor-liquid polymerization system, the polymerization occurred in the liquid phase where gas ethylene was pressurized into the solution and liquid propylene was fed into the reactor prior to the addition of the catalyst solutions. Prior to polymerization, the reactor was first washed with toluene and then dried with nitrogen purge at 150° C. for one hour. Afterward, 2 ml toluene solution of TIBAL (triisobutylaluminum, Sigma Aldrich), as a scavenger, was charged into the reactor before the addition of isohexane solvent. Ethylene and isohexane came from ExxonMobil Chemical Company and all have been purified.

The catalyst for synthesizing low molecular weight vinyl terminated polyethylene used is 6,6'-((ethane-1,2-diylbis(methylazanediyl)bis(methylene)) bis(2-(9H-carbozol-9-yl)-4-methylphenoxide) zirconium dibenzyl activated with dimethylanilinium tetrakis(pentafluorophenyl) borate. An amount of 2 mg of catalyst and 1.8 mg of activator were dissolved in 2 ml of toluene to pre-activate the catalyst and to prepare the catalyst solution. This catalyst solution was then injected into the reactor at 100° C. reactor temperature under 200 psi ethylene pressure. Polymerization began immediately upon addition of the catalyst, and was allowed to continue under controlled reactor temperature for 30 minutes. Afterward, the reactor was allowed to reach room temperature and depressurized by venting. The polymerization solution was poured into an aluminum tray. The polymer was collected and allowed to dry over 16 h under ambient condition. The polymer was dried further under vacuum at 60° C. Based on proton NMR, the resulting polyethylene, VTPE (vinyl terminated polyethylene), has 98% vinyl (98 mole % chain ends are vinyl) chain ends. Using GPC-IR, it was found that this VTPE has a Mn of 4,000 g/mole, an Mw of 11,300 g/mole, and Mw/Mn value of 2.82.

Alkylation of Phenyl-Ethers Oligomer with Vinyl Terminated Polyethylene.

Figure 1:
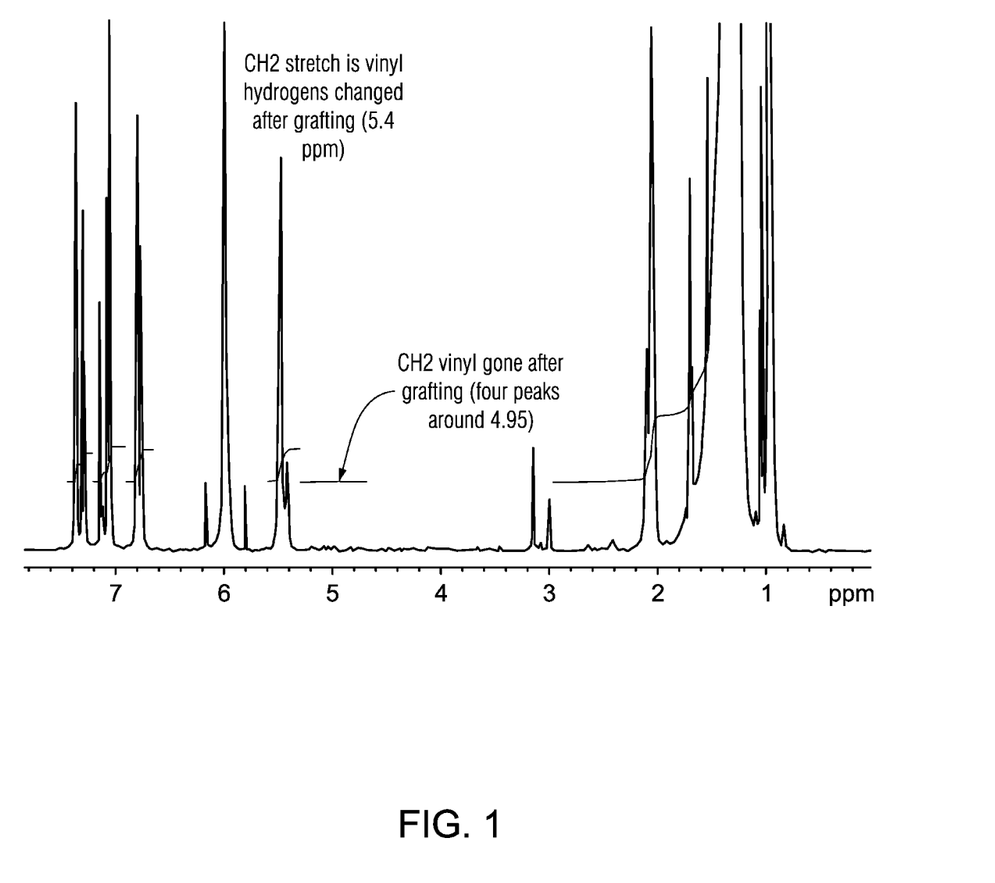
FIG. 1 is a proton NMR spectra of an inventive graft copolymer of arylene-ether oligomer and vinyl/vinylidene terminated polyethylene (PPE-g-PE).

A pentamer of phenyl-ethers oligomer (PPE, Santovac™ 5P, from Santolubes, Mw of 446 g/mol) was used as the PPE backbone. Under nitrogen protection, 8 g of PPE pentamer was dissolved in 250 ml anhydrous ortho-dichlorobenzene (o-DCB, Sigma Aldrich) solvent in a 500 ml 3-neck round bottom flask equipped with a condenser at 120° C. along with 21 g of VTPE and 0.025 g of the stabilizer package powders. The stabilizer package consists of 50 wt % Irganox™ 1076 (Sigma Aldrich) and 50 wt % Irgafos™ 168 (Sigma Aldrich). Once PPE oligomer and VTPE polymer were fully dissolved, 0.6 g of methansulfonic acid (MSA) catalyst for alkylation was then slowly added into the solution. Afterward, the solution temperature was raised to the reflux o-DCB temperature (o-DCB's b.p. is 180.5° C.). Reaction was allowed to be conducted at reflux under nitrogen protection for 4 hours. The reaction scheme for alkylation of PPE pentamer can be found in Scheme (1). The resulting PPE-g-PE was recovered by precipitate the reaction solution to a 1 liter methanol, washed with methanol and dry. It was evaluated by proton NMR (see FIG. 1 for the NMR spectrum) and found that 99.5% of VTPE has been grafted onto PPE.

The scheme (1) below shows the general process of alkylation of PPE pentamer with VTPE, wherein "n" can vary as described above for VTM's, wherein "R" is hydrogen:

(1)

where the PPE and the VTM, in this case a polyethylene or VTPE of length "n" is reacted with the catalyst effect alkylation of the PPE with the VTPE to afford the PPE-g-PE. In this example, two VTPE units graft onto the PPE. It could be more or only one.

Solution Dispersion of GNPs Using PPE-g-PE Dispersants.

The solution dispersion of GNP in PPE-g-PE dispersants can be done directly after the grafting reaction or separately after recovery of PPE-g-PE dispersants. In this example, the dispersion is done separately. Under nitrogen protection, 5 g of GNPs (XGnP C, 500 m²/g average surface areas, 2 to 2.25 g/cm³ density, XG Sciences) were dispersed in 250 ml o-DCB solvent in a 500 ml 3-neck round bottom flask equipped with a condenser at 150° C. Then, 20 g of PPE-g-PE were added in along with 0.1 g butylated hydroxytoluene (Sigma Aldrich) stabilizer for a dispersant to GNP ratio of 4. After complete dissolution, the mixing was run at refluxing o-DCB for 4 hours and the master batch was precipitated in 1 liter isopropanol when it is still warm. Thus recovered master batch was filtered, washed with fresh isopropanol, and dry in a vacuum oven at 100° C. overnight.

Solid State Mixing of GNP/PPE-g-HDPE Master Batch with HDPE.

Figure 2:
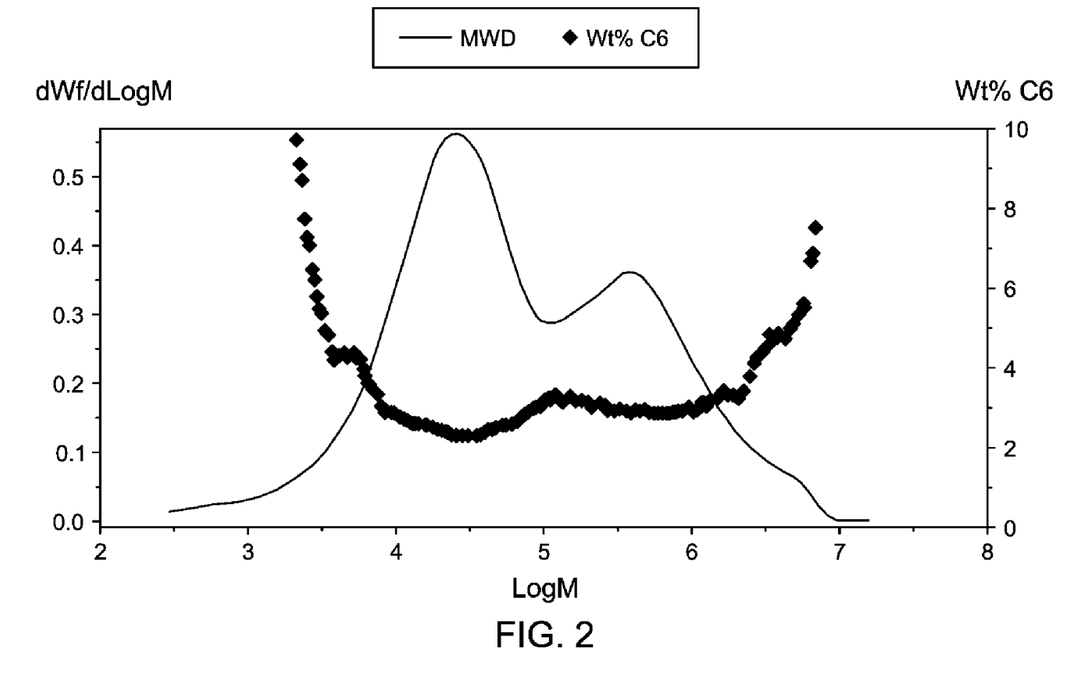
FIG. 2 is a Gel Permeation Chromatogram (GPC) of a bimodal high density polyethylene (bHDPE) useful in blends with the PPE-g-PE.

A bimodal HDPE, bHDPE, from ExxonMobil Chemical which is a PE100 pipe material, was selected. Its bimodality can be seen in FIG. 2 with Mn of 13,000 g/mole, Mw of 349,000 g/mole, and Mw/Mn of 27.4. This bHDPE was melt blended with PPE-g-PE/GNP master batch and with GNP directly without dispersants in a Brabender internal mixer at 200° C. and 60 RPM for 5 minutes. Sample descriptions can be found in Table 1 where Example 1 is just the bHDPE control. In mixtures with the bHDPE, based on the GNP weight percent, PPE-g-PE was used at 4 to 1 ratio, or 4 g of PPE-g-PE for 1 g of GNP.

TABLE 1

Sample descriptions.

| Sample | HDPE | GNP (wt %) | PPE-g-PE (wt %) |
|---|---|---|---|
| Example 1 | bHDPE | 0 | — |
| Example 2 | bHDPE | 5 | — |
| Example 3 | bHDPE | 1 | 4 |
| Example 4 | bHDPE | 5 | 17 |

Dispersion States and Properties of HDPE-GNP Composites.

Samples of Examples 2-4 were cryo-faced using a cryo-microtome (Lycra) at −120° C. and then examined using a Phenom™ desktop SEM (Phenom) at 5 KeV electron voltage. SEM micrographs at 500× magnification where performed on the samples, and it was found that the appearance of white clumps and particles are the GNP agglomerates and aggregates. From the SEM data, it was found that GNPs are better dispersed in Examples 3 and 4 in comparison with that in Example 2 demonstrating the effectiveness of PPE-g-PE dispersants.

Mechanical properties were measured on compression molded specimens of Examples 1 to 4 where thermal stability was determined using TGA (thermal gravimetric analyzer) on compression molded specimens. Measured mechanical and thermal properties of Examples 1 to 4 are listed in Table 2. With better dispersion in the presence of PPE-g-PE dispersants, higher modulus and elongation to break and slightly better thermal stability can be achieved in PE-GNP composites. The low elongation to break observed in Example 2 is a result of its poor dispersion of GNP. It is expected that further optimization of dispersant to GNP ratio and VTPE MW can lead to stronger GNP reinforcement of HDPE without compromising the extensibility of HDPE.

TABLE 2

Mechanical and thermal properties of Examples 1-4.

| Sample | GNP (wt %) | PPE-g-PE | Modulus (MPa) | Break strain (%) | Thermal Stability (° C.) |
|---|---|---|---|---|---|
| Example 1 | 0 | No | 1366 | 299 | 488 |
| Example 2 | 5 | No | 1702 | 84 | 491 |
| Example 3 | 1 | Yes | 1645 | 320 | 492 |
| Example 4 | 5 | Yes | 1805 | 152 | 492 |

Having described the various features of the graft copolymers and how they are made, disclosed here in numbered paragraphs is:

P1. A graft copolymer (PPE-g-PO) comprising an arylene-ether oligomer group having at least one polyolefin moiety bound thereto, wherein the arylene-ether oligomer has a number average molecular weight (Mn) of less than 5,000 g/mole and the polyolefin has Mn of less than 10,000 g/mole.

P2. The graft copolymer of numbered paragraph 1, wherein the polyolefin group is a polyolefin selected from the group consisting of polyethylene, polypropylene, ethylene-propylene copolymer, hexene-ethylene copolymer, octene-ethylene copolymer, and combinations thereof.

P3. The graft copolymer of numbered paragraph 1, wherein the arylene-ether oligomer group has an Mn within a range of from 100 g/mole to 5,000 g/mole.

P4. The graft copolymer of numbered paragraph 1, wherein the arylene monomer units are linked to one another in the meta position through an oxygen atom.

P5. The graft copolymer of numbered paragraph 1, wherein the polyolefin group has an Mn within a range of from 200 g/mole to 10,000 g/mole.

P6. The graft copolymer of numbered paragraph 1, further comprising graphite nanoplatelets.

P7. The graft copolymer of numbered paragraph 6, wherein the graphite nanoplatelets have an average surface area within a range from 100 m$^2$/g to 1000 m$^2$/g.

P8. The graft copolymer of numbered paragraph 6, wherein the graphite nanoplatelets have a density within a range from 1 g/cm$^3$ to 4 g/cm$^3$ density.

P9. The graft copolymer of numbered paragraph 6, wherein the graphite nanoplatelets have an average thickness within a range from 2, or 5, to 10, or 15, or 20, or 40, or 60, or 80, or 100 nanometers and an average width within a range from 1 to 20, or 30, or 40, or 50 µm.

P10. The graft copolymer of numbered paragraph 6, further comprising a HDPE.

P11. The graft copolymer of numbered paragraph 10, wherein the HDPE has an Mw/Mn of at least 3.

P12. The graft copolymer of numbered paragraph 10, comprising within a range from 1 wt % to 40 wt % of the PPE-g-PO by weight of the HDPE, PPE-g-PO, and graphite nanoplatelets.

P13. The graft copolymer of numbered paragraph 10, comprising within a range from 1 wt % to 15 wt % graphite nanoplatelets by weight of the HDPE, PPE-g-PO, and graphite nanoplatelets.

P14. Automotive components comprising the PPE-g-PO of numbered paragraph 1.

P15. A method to prepare a graft copolymer comprising: reacting a neat or diluted arylene-ether oligomer with a vinyl or vinylidene-terminated polyolefin at a temperature of at least 80° C. to form heated reaction components; further reacting a Brønsted acid or Lewis acid with the heated reaction components to form a PPE-g-PO.

P16. The method of numbered paragraph 15, wherein the vinyl or vinylidene-terminated polyolefin is a polyolefin selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

P17. Method of numbered paragraph 15, wherein the arylene monomer units are linked to one another in the meta position through an oxygen atom.

P18. The method of numbered paragraph 15, wherein the arylene-ether oligomer has a Mn of less than 5,000 g/mole.

P19. The method of numbered paragraph 15, wherein the vinyl or vinylidene-terminated polyolefin has an Mn of less than 10,000 g/mole.

P20. The method of numbered paragraph 15, further comprising combining graphite nanoplatelets to the polyolefin-arylene-ether oligomer.

P21. The method of numbered paragraph 20, wherein the graphite nanoplatelets are added to the polyolefin-arylene-ether oligomer reaction mixture, individually or together, preferably as a masterbatch, without isolating the polyolefin-arylene-ether oligomer.

P22. The method of numbered paragraph 20, wherein the graphite nanoplatelets have a density within a range from 1 g/cm$^3$ to 4 g/cm$^3$ density.

P23. The method of numbered paragraph 20, wherein the graphite nanoplatelets have an average thickness ranging from 1, or 4, or 10 to 20, or 40 nanometers and an average width within a range from 1 to 20, or 30, or 40, or 50 µm P23. The method of numbered paragraph 20, further comprising combining a HDPE.

P24. The method of numbered paragraph 23, wherein the HDPE has an Mw/Mn of at least 3.

P25. The method of numbered paragraph 23, comprising within a range from 1 wt % to 40 wt % of the PPE-g-PO by weight of the HDPE, PPE-g-PO, and graphite nanoplatelets.

P26. The method of numbered paragraph 23, comprising within a range from 1 wt % to 15 wt % graphite nanoplatelets by weight of the HDPE, PPE-g-PO, and graphite nanoplatelets.

Also described is the use of the PPE-g-PO in a composite comprising graphite nanoplatelets and polyolefin(s) in an automotive component are pipe.

As used herein, "consisting essentially of" means that the claimed PPE-g-PO or composite including the PPE-g-PO includes only the named components and no additional components that will alter its measured properties by any more than 10 or 20%; and most preferably means that additional components or "additives" are present to a level of less than 5, or 4, or 3, or 2 wt % by weight of the composite. Such additives can include, for example, fillers, colorants, antioxidants, alkyl-radical scavengers, anti-UV additives, acid scavengers, slip agents, foaming agents, curatives and cross-linking agents, aliphatic and/or cyclic containing oligomers or polymers (sometimes referred to as "hydrocarbon resins"), and other additives well known in the art.

As it relates to a process, the phrase "consisting essentially of" means that there are no other process features that will alter the claimed properties of the polymer, polymer blend or article produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A composition comprising:
   a graft copolymer (PPE-g-PO) comprising an arylene-ether oligomer group having at least one polyolefin moiety bound thereto, wherein the arylene-ether oligomer group has an Mn of less than 5,000 g/mole and the polyolefin moiety has an Mn of less than 10,000 g/mole; and
   a plurality of graphite nanoplatelets having a density from 1 g/cm$^3$ to 4 g/cm$^3$.

2. The composition of claim 1, wherein the polyolefin moiety is selected from the group consisting of polyethylene, polypropylene, ethylene-propylene copolymer, hexene-ethylene copolymer, octene-ethylene copolymer, and combinations thereof.

3. The composition of claim 1, wherein the arylene-ether oligomer group has an Mn of 100 g/mole to 4,000 g/mole.

4. The composition of claim 1, wherein the arylene-ether oligomer group comprises a plurality of arylene monomer units linked to one another in the meta position through an oxygen atom.

5. The composition of claim 1, wherein the polyolefin moiety has an Mn of 200 g/mole to 8,000 g/mole.

6. The composition of claim 1, wherein the plurality of graphite nanoplatelets has a density from 1.5 g/cm$^3$ to 3.5 g/cm$^3$.

7. The composition of claim 1, wherein the plurality of graphite nanoplatelets has an average thickness from 2 to 100 nanometers and an average width from 1 µm to 50 µm.

8. An automotive component comprising the composition of claim 1.

9. The composition of claim 1, wherein the graphite nanoplatelets have an average surface area from 100 m$^2$/g to 1000 m$^2$/g.

10. A method to prepare the composition of claim 1 comprising:
reacting a neat or diluted arylene-ether oligomer with a vinyl or vinylidene-terminated polyolefin at a temperature of at least 80° C. to form a plurality of heated reaction components;
reacting a Brϕnsted acid or Lewis acid with the plurality of heated reaction components to form the PPE-g-PO; and
combining the PPE-g-PO with the plurality of graphite nanoplatelets.

11. The method of claim 10, wherein the vinyl or vinylidene-terminated polyolefin is selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

12. A composition comprising:
a graft copolymer (PPE-g-PO) comprising an arylene-ether oligomer group having at least one polyolefin moiety bound thereto, wherein the arylene-ether oligomer group has an Mn of less than 5,000 g/mole and the polyolefin moiety has an Mn of less than 10,000 g/mole;
a plurality of graphite nanoplatelets, and a high density polyethylene.

13. The composition of claim 12, wherein the high density polyethylene has an Mw/Mn of at least 3.

14. The composition of claim 12, wherein the composition comprises from 1 wt % to 40 wt % of the PPE-g-PO based on the weight of the high density polyethylene, the PPE-g-PO, and the plurality of graphite nanoplatelets.

15. The composition of claim 12, comprising from 1 wt % to 15 wt % of the plurality of graphite nanoplatelets based on the weight of the high density polyethylene, the PPE-g-PO, and the plurality of graphite nanoplatelets.

16. The composition of claim 12, comprising from 5 wt % to 15 wt % of the plurality of graphite nanoplatelets-based on the weight of the high density polyethylene, the PPE-g-PO, and the plurality of graphite nanoplatelets.

17. A method to prepare a composition comprising:
a graft copolymer (PPE-g-PO) comprising an arylene-ether oligomer group having at least one polyolefin moiety bound thereto, wherein the arylene-ether oligomer group has an Mn of less than 5,000 g/mole and the polyolefin moiety has an Mn of less than 10,000 g/mole;
a plurality of graphite nanoplatelets, and
high density polyethylene,
said method comprising:
reacting a neat or diluted arylene-ether oligomer with a vinyl or vinylidene-terminated polyolefin at a temperature of at least 80° C. to form a plurality of heated reaction components;
reacting a Brϕnsted acid or Lewis acid with the plurality of heated reaction components to form the PPE-g-PO; and
combining the PPE-g-PO with the plurality of graphite nanoplatelets and high density polyethylene.

* * * * *